Feb. 26, 1957 F. A. KROHM 2,782,446
WINDSHIELD WIPER BLADE UNIT AND PRESSURE UNIT THEREFOR
Original Filed July 3, 1952 2 Sheets-Sheet 2
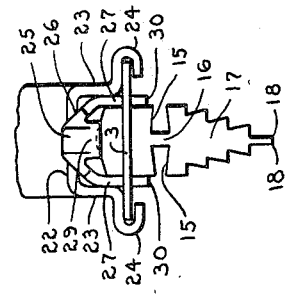
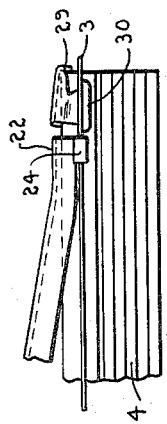
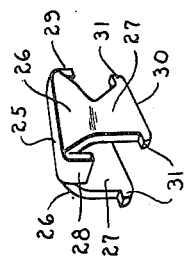
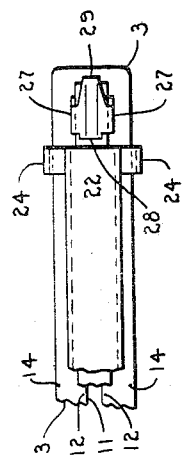
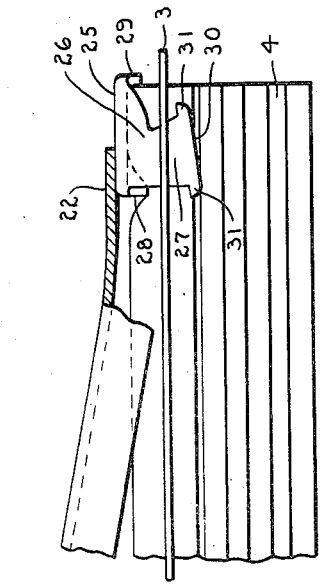
INVENTOR.
FRED A. KROHM
BY
Charles S. Penfold
ATTORNEY United States Patent Office 2,782,446
Patented Feb. 26, 1957

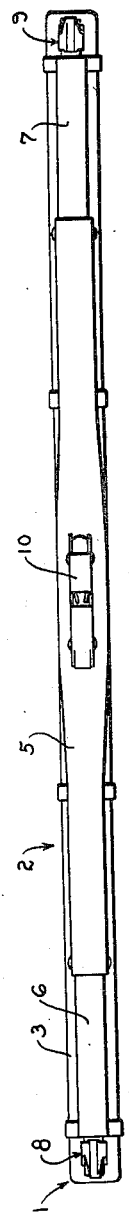
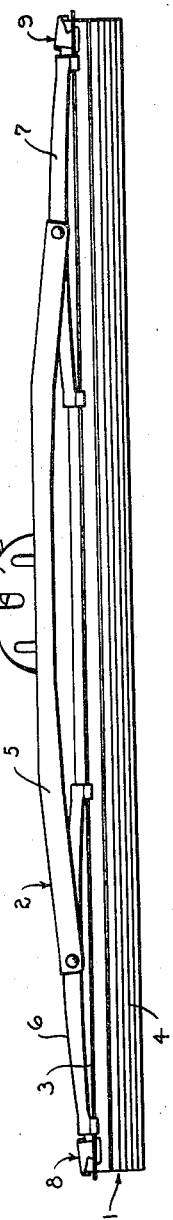
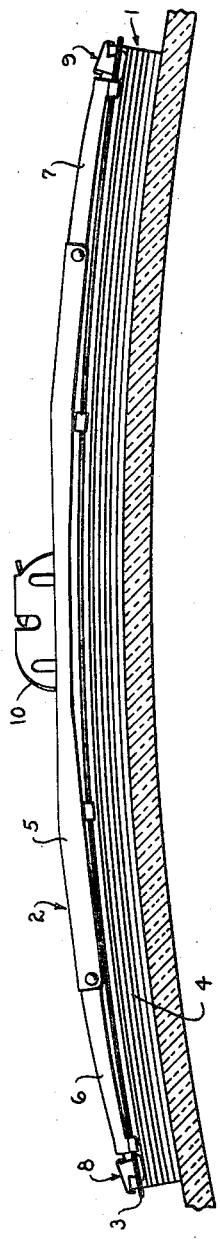
INVENTOR.
FRED A. KROHM

2,782,446

WINDSHIELD WIPER BLADE UNIT AND PRESSURE UNIT THEREFOR

Fred A. Krohm, Hobart, Ind., assignor to Productive Inventions, Inc., a corporation of Indiana Continuation of application Serial No. 297,098, July 3, 1952. This application November 21, 1956, Serial No. 626,039

12 Claims. (Cl. 15—245)

This invention relates generally to windshield wiper apparatus and more particularly it is directed to an assembly comprising a wiper blade unit and a pressure unit operatively connected thereto for conforming the blade unit to a surface to be wiped.

One of the principal objects of the invention is to provide a windshield wiper blade unit comprising a resilient wiping element and a flexible support therefor and an improved method whereby the wiping element may be readily connected to the support. More specifically, the support is provided with an elongated relatively narrow slot, the ends of which are enlarged to provide pilot openings to permit selective entry of either end of the wiping element into either opening to facilitate manipulation of the element into the slot.

An important object of the invention is to provide a pair of corresponding improved yieldable locking means which, among other things, serve to limit relative longitudinal sliding movement between the units.

A significant object of the invention is to provide locking means of such a character that either one may be manipulated to permit a quick assembly or disassembly of the units, to facilitate manufacture of the device and at the same time afford an arrangement whereby a worn blade unit may be readily replaced with a new one.

Another object of the invention is to provide locking means which are preferably adapted to receive and protect end portions of the wiping element and improve the general design of the complete assembly.

Another object of the invention is to provide a unitary resilient backing support producible out of a single stamping operation, to insure substantial uniformity of thickness of the metal, and therefore uniformity of reactive characteristics.

Another object of the invention is to provide a unitary resilient backing support producible out of a single stamping operation so that the edges exposed to the rubber will be straight and true and parallel with each other, avoiding irregularities due to camber in individual strips, which camber produces wide cross-sectional spacing between the sides of the strip and permits more ready displacement of the rubber under torsional stress in service.

A particular object of the invention is to provide locking means which are normally maintained in predetermined normal locking positions by the wiping element, the arrangement being such that the pressure unit may be slid lengthwise relative to the blade unit to a position between the locking means by depressing one of the locking means.

A further object of the invention is to provide an improved wiper assembly which offers many advantages with respect to manufacture and assembly.

Other objects and advantages of the invention will become apparent after the description hereinafter set forth is considered in conjunction with the drawings.

Various other forms of locking means or abutment means generally related to the subject application are disclosed in my copending applications, Serial Nos. 334,147 and 341,051; and in applications of John W. Anderson, Serial Nos. 404,279, 573,012 and 612,542. This application is a continuation of application No. 297,098 filed July 3, 1952.

In the drawing wherein a preferred embodiment of the invention is exemplified:

Figure 1 is a top view of the wiper assembly;

Figure 2 is a side view in elevation of the assembly illustrated in Figure 1;

Figure 3 is a side view in elevation showing application of the wiper assembly to a curved surface;

Figure 4 is a partial top view of one extremity of the wiper assembly;

Figure 5 is a side view in elevation of the structure illustrated in Figure 4;

Figure 6 is a partial end view in elevation of the wiper assembly;

Figure 7 is a side view of a portion of the wiper assembly, exemplifying the manner of operating one of the locking means during the assembly of the wiper blade unit on the pressure distributing unit;

Figure 8 is a perspective view of one of the locking means; and

Figure 9 is a perspective view illustrating the manner of assembling the resilient wiper element with the flexible support.

In the drawings, numeral 1 designates a resiliently flexible wiper blade unit and 2 a pressure distributing unit. The wiper blade unit includes, among other things, a flexible support 3 and a resilient wiping element 4 and the pressure unit a channel primary yoke 5 and a pair of corresponding curved channel secondary yokes 6 and 7 which are pivotally connected intermediate their ends to the ends of the primary yoke. The ends of the secondary yokes are slidably connected to the wiper blade unit in a manner that will be described subsequently.

A pair of corresponding locking means 8 and 9 serve to detachably hold the pressure unit and blade unit assembled. The primary yoke is provided with a connector 10 for attachment with a wiper arm.

The support for the resilient wiping element is preferably constructed from a single piece of material such as stainless steel spring strip stock having uniform thickness and width so that the support is uniformly resiliently flexible only in a single plane. The support is provided with a centrally disposed longitudinally extending narrow slot 11. This slot, among other things, serves to promote flexibility of the support. The inner longitudinal marginal edge portions 12 of the support defining the slot are received in opposed corresponding longitudinal grooves 13 provided in the sides of the wiping element and the outer longitudinal marginal edge portions 14 of the support extend outwardly from the wiping element and are slidably received in formations provided adjacent the ends of the secondary yokes.

The wiping element 4 may be constructed in various ways but as herein illustrated it is preferably made in one piece and includes a body having the grooves 13 therein and an additional pair of grooves 15 in its sides so as to provide a web 16 flexibly joining a portion 17 having wiping edges 18.

The inner opposed longitudinal marginal edge portions 12 of the support are preferably interrupted by two pairs of opposed notches, each pair of adjacent notches cooperating to provide a generally rectangular or square opening adjacent each extremity of the support. Each notch is defined by a longitudinal marginal edge 19 and a pair of generally transverse marginal edges 20 and 21. The edges 21 are slightly rounded so as to assist in piloting the edge portions 12 of the support into the grooves 13 of the wiping element during the assembly operation. It will be noted that the openings, which respectively receive the locking means 8 and 9, are spaced relatively short distances inwardly from the ends of the longitudinal slot 11 so that the end portions of the wiping element extending beyond the openings are supported.

Each end formation on a secondary yoke includes a top wall constituting a continuation of the curved base wall 22 of the yoke, a pair of side walls 23 and a pair of corresponding U-shaped offsets 24 which slidably embrace the support. The offsets are constructed so as to assist in controlling the relative lateral pivotal movement between the blade unit and pressure unit.

The locking means 8 and 9 are preferably substantially identical in design and construction. Each is generally of channel form and includes a top wall 25, inclined or sloping walls 26, parallel side walls 27, an inner end wall 28 and an outer end wall 29. When the locking means are assembled in the openings of the support as shown in Figures 1, 2, and 3, they receive the end portions of the wiping element and, from a distance more or less, appear as end continuations of the secondary yokes to promote harmony in the general design of the complete structure. The inner end walls or abutments 28 of the locking means engage the upper portion of the wiping element and the outer end walls 29 abut the ends of the element and are spaced from the support 3. The end walls or abutments 28 serve as stops limiting the travel of the pressure unit and the blade unit. It will be noted that the sloping walls 26 are of a length greater than the width of the side walls 27 and taper slightly toward the outer end wall 29 and that the lower marginal edge 30 of each side wall is inclined with reference to the top wall 25 and has a pair of offset stops 31 thereon.

Both locking means may be assembled with the support after the wiping element is assembled with the support. In production, however, one locking means is connected to the support prior to attaching the wiping element to the support and the other is connected after the element is attached to the support. Each locking means is assembled with the support by manually inserting the means upwardly into an opening to a predetermined position so that the side walls 27 are respectively interlocked with the notches with the stops 31 engaging the underside of the support to limit upward movement of the locking means.

In assembling the structure, one of the locking means, such as 8, is secured in one of the openings as indicated above. Either end of the wiping element is then inserted through the other opening in the opposite extremity of the support so that the grooves 13 in the element will first receive the curved edge portions 21 of the support, after which the complete element is pulled or otherwise forced into the slot 11 to place the marginal edges 12 in the grooves. After the element is thus secured to the support without aid of any clamps or other fastening means, the end of the element last to enter the slot is forced inwardly from the said other opening whereupon the locking means, such as 9, is inserted in such opening in the same manner as the locking means 8, whereupon the end of the element is forced outwardly to its normal position so that it will rest in the locking means 9 in the same manner that the opposite end of the element rests in the locking means 8. With this novel arrangement the locking means are detachably held in place with their inner end walls 28 engaging the upper portion of the wiping element to locate their top walls 25 in inclined positions so that the top walls will more or less appear as continuations of the outer ends of the secondary yokes as illustrated in Figures 1, 2 and 3.

The pressure unit and blade unit can be assembled in more than one way but is preferably accomplished by placing the outer end formation of the secondary yoke 6 into embracing relationship with the outer marginal edges 14 at the right end of the support, whereupon the pressure unit is slid longitudinally inward so that the inner end formation of the yoke 6 and the inner and outer end formations on the secondary yoke 7 successively receive the edges 14 and the locking means 9. When the pressure unit and blade unit are properly assembled the pressure unit is held for limited sliding movement between the locking means. During this inward movement the locking means 9 is depressed against the wiping element four separate times, in the manner illustrated in Figure 7. It will be noted that the locking means are such that they are readily received by the end formations on the secondary yokes and that due to the character of walls 22 on such formations and the top walls 25 of the locking means the locking means 9 is automatically cammed against the resiliency of the wiping element so that it is unnecessary to manually depress such locking means as each formation approaches the locking means.

To disassemble the blade unit and pressure unit the locking means 9 is manually depressed as shown in Figure 7, whereupon the pressure unit is pulled outwardly to release the end formations of the secondary yoke 7 from the blade unit. The locking means is then depressed again in the same manner, whereupon the pressure unit is pulled outwardly to release the end formations on the secondary yoke 6 from the blade unit. Due to the character of the locking means and the formations, it is only necessary to manually depress the locking means 9 once for the outer formation on the yoke 7 and once for the inner formation of the yoke 6 because the other formations on the yokes automatically cam the locking means against the wiping element as the pressure unit is being detached from the blade unit. With this unique arrangement, a worn or damaged blade unit or pressure unit can be readily replaced with a new one.

In view of the foregoing it will be manifest that the various components comprising each unit can be easily and quickly assembled. More particularly in this regard, either end of the wiping element can be inserted into either of the openings for receiving the inner edges of the slot 11, either of the locking means can be inserted into either of the openings, and either extremity of the pressure unit can be slid onto or removed from either end of the blade unit. This arrangement reduces production costs by facilitating assembly of the components.

While the above description has been given in detail, it is not the intention to thereby restrict the scope of the invention beyond that defined by the appended claims since the inventive principles thereof are capable of assuming other physical embodiments than those hereinbefore described.

I claim:

1. A windshield wiper blade unit comprising a resiliently flexible support provided with a longitudinally extending slot and a resilient wiper element secured in the slot, abutment means on one extremity of the unit for limiting longitudinal movement of a pressure device in one direction when connected to the unit, and a locking member on the other extremity of the unit for limiting movement of such a device in the opposite direction, said locking member having a portion extending through the slot and engaging the underside of the support and also having a portion overlying a portion of the wiper element in a manner whereby when pressure is applied to the member the member will be moved to compress the said portion of the wiper element so that the blade unit can be assembled and disassembled with respect to such a pressure device.

2. A windshield wiper blade unit comprising a resiliently flexible support and a resilient wiper element secured thereto, a locking member attached to each extremity of the support and cooperating with the wiper element in a manner to cause the element to yield when force is applied to the member, and a pressure device having end formations mounted on the blade unit between the locking members, said formations and said locking members being so formed that either formation will telescopically receive either end of the blade unit and thereby automatically retract a locking member without prior manual adjustment of such member.

3. A windshield wiper blade unit comprising a resiliently flexible support and a resilient wiper element secured thereto, a locking member attached to each extremity of the support and cooperating with the wiper element in a manner to cause the element to yield when force is applied to the member, each of said locking members being provided with a cam surface, and a pressure device having end formations slidably mounted on the support to a position between the locking members, said formations and locking members being formed to permit telescopic assembly of the blade unit and device by sliding either end of the support through the said formations so the latter will engage a cam surface and automatically retract a locking element over which the formations slide.

4. In a windshield wiper blade assembly having a resilient wiping element, a resiliently flexible backing strip generally longitudinally co-extensive with said element, and a pressure-distributing yoke slidably engageable with said backing strip, the improvement of an abutment for preventing displacement of said yoke from said strip, said abutment comprising a central portion overlying said wiper element, and depending leg portions formed integrally with said central portion and interposed between said wiper element and said backing strip to retain said abutment in position upon said blade assembly and in the path of sliding movement of said yoke.

5. A windshield wiper blade unit comprising a resiliently flexible support provided with a longitudinally extending slot and a resilient wiper element secured in the slot, a pressure device mounted on the blade unit, abutment means on one extremity of the unit for limiting longitudinal movement of the pressure device in one direction when connected to the unit, and a locking member on the other extremity of the unit for limiting movement of the device in the opposite direction, said locking member having a portion extending through the slot and engaging the underside of the support and also having a portion overlying a portion of the wiper element in a manner whereby the member may be moved to compress the said portion of the wiper element as often as is necessary so that the pressure device can be moved over the member to connect or release the device from the blade unit.

6. A windshield wiper blade unit comprising a resiliently flexible support and a resilient wiper element, said support being provided with a longitudinally extending slot enlarged at its ends to form openings to permit insertion of either end of the wiper element through either opening into connection with the slot, a pressure device adapted for connection with the blade unit, abutment means secured in one of the openings for limiting longitudinal movement of the pressure device in one direction when connected to the unit, and a locking member located adjacent the other extremity of the unit for limiting movement of the device in the opposite direction, said locking member having a portion extending into the other opening and engaging the underside of the support and also having a portion overlying a portion of the wiper element in a manner whereby the pressure device when moved lengthwise into connection with the blade unit will cause retraction of the member to compress the said portion of the wiper element so as to permit and facilitate connecting of the pressure device with the blade unit between the abutment means and locking member.

7. A windshield wiper blade unit comprising an elongated resiliently flexible support and an elongated resilient element secured thereto, abutments respectively provided at the extremities of the support, one of said abutments cooperating with the wiper element in a manner to cause the element to yield when force is applied to retract this abutment, and a pressure device having end formations mounted on the blade unit between the abutments, said formations and said retractible abutment being so formed that either formation will telescopically receive that end of the blade unit provided with said retractible abutment and thereby automatically retract this abutment during assembly of the blade unit and pressure device without prior manual adjustment of said retractible abutment.

8. A windshield wiper blade unit comprising a resiliently flexible support and a resilient wiper element secured thereto, a locking member attached to each extremity of the support, one of said members cooperating with the wiper element in a manner to cause the element to yield when force is applied to retract the member, said retractible member being provided with a cam surface, and a pressure device having end formations slidably mounted on the support to a position between the locking members, said formations and retractible member being formed to permit telescopic assembly of the blade unit and device by sliding one end of the support through the said formations so the latter will successively engage the cam surface and automatically retract the retractible element over which the formations slide.

9. In a windshield wiper blade assembly comprising a resilient wiping element and a resiliently flexible backing strip generally longitudinally co-extensive with said element, a pressure-distributing yoke slidably engageable with said assembly, means on the assembly for limiting movement of the yoke in one direction, the improvement of an abutment for limiting movement of said yoke in an opposite direction, said abutment comprising a central portion overlying said wiper element, and depending leg portions formed integrally with said central portion and interposed between said wiper element and said backing strip to retain said abutment in position upon said blade assembly and in the path of sliding movement of said yoke.

10. A windshield wiper comprising: a wiper blade assembly having a resilient wiping element and a flexible support therefor, a pressure device mounted on the support, said support having an elongated slot with the wiping element secured therein, means adjacent one end of the blade assembly for limiting movement of the pressure device thereon in one direction, and means adjacent the other end of the assembly comprising a fitting having a portion held in the slot by the wiping element for limiting movement of the blade assembly in the opposite direction.

11. A windshield wiper comprising a blade assembly having a resilient wiping element and a resiliently flexible support secured thereto so that portions of the element overlie the upper surface of the support, abutment means carried by the ends of the support, and a pair of fittings for limiting relative longitudinal movement between the blade assembly and a pressure device adapted for support thereon, each of said fittings having a portion engaging an abutment means for limiting outward movement of the fitting, and other portions disposed between the support and portions of the element.

12. A windshield wiper comprising a wiper blade assembly having a resilient wiping element and a flexible support therefor, said support having an elongated slot with the wiping element secured therein, means adjacent one end of the blade assembly for limiting in one direction movement of a pressure device adapted for connection with the assembly, and means adjacent the other end of the assembly comprising a fitting having a portion held in the slot by the wiping element for limiting movement of such a device on the blade assembly in an opposite direction.

References Cited in the file of this patent

UNITED STATES PATENTS

| 2,069,219 | Conlon | Feb. 2, 1937 |
| 2,548,090 | Anderson | Apr. 10, 1951 |